Patented Aug. 13, 1940

2,211,616

UNITED STATES PATENT OFFICE 2,211,616

VULCANIZATION OF RUBBER

Albert M. Clifford, Stow, Ohio, assignor to Wingfoot Corporation, Wilmington, Del., a corporation of Delaware No Drawing. Application February 10, 1936, Serial No. 63,213

2 Claims. (Cl. 260—787)

This invention relates to a new class of compounds which has been found valuable as accelerators of the vulcanization of rubber. More particularly, the invention relates to derivatives of mercaptothiazoles which may be called thiazyl 1-thio methylene acylates and aromatic carbamates. They may be represented by the formula $T—S—CH_2O—R$ wherein T is a 1-thiazyl radical and R is an acyl radical of a carboxylic acid, including aromatic carbamyl radicals.

A more preferred class of compounds of the invention are the 1-arylene thiazyl 1-thio methylene acylates, represented by the formula

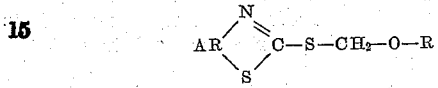

wherein AR is an ortho aromatic group of the benzene and naphthalene series and R is an acyl radical of a carboxylic acid.

It is an object of this invention to provide a new class of compounds. It is a further object to provide a new class of mercaptothiazole derivatives which are good semi-ultra accelerators of vulcanization when activated by basic nitrogen-containing accelerators such as diphenylguanidine. Other objects and advantages will become apparent as the description of the invention proceeds.

The compounds of the invention are conveniently prepared by reacting a thiazyl 1-thio methylene hydrin with an acyl halide or with an aromatic iso cyanate. The reaction proceeds with facility and is carried out simply by bringing the two reactants together, preferably with heating, although extraneous heating is not necessary in all cases. The products are in general easily purified and are obtained in high yields.

Further illustrating the invention is the preparation of benzothiazyl 1-thio methylene acetate which is prepared by adding 350 grams of acetyl chloride to 150 grams of benzothiazyl 1-thio methylene hydrin, the temperature of the mixture being maintained at 35–40° C. until the evolution of hydrogen chloride gas had practically ceased. The excess acetyl chloride was removed by heating the mass to a temperature of 90–95° C. under a pressure of 100 mm. The residue was then crystallized from a mixture of equal parts of ether and alcohol. The product, benzothiazyl 1-thio methylene acetate, was a pale yellow solid and melted at 70–77° C. Upon analysis, it was found to contain an average nitrogen content of 27.93% and an average sulphur content of 6.03%. The theoretical nitrogen and sulphur contents for benzothiazyl 1-thio methylene acetate are, respectively, 26.9% and 5.85%. The equation representing the reaction is as follows:

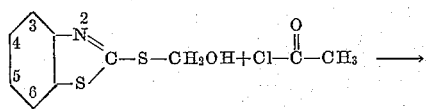

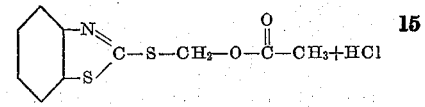

The corresponding benzoate compound may be prepared similarly by heating a mixture of 200 grams of benzoyl chloride and 100 grams of benzothiazyl 1-thio methylene hydrin in a boiling water bath until the evolution of hydrogen chloride gas ceased. The product was washed with ether, stirred with dilute sodium hydroxide solution, filtered, washed with water and dried. It was obtained in a yield of 108 grams as a pale yellow solid melting at 65–75° C. It was soluble in warm benzene and toluene but relatively insoluble in methanol. The equation representing the reaction is as follows:

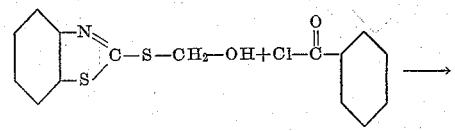

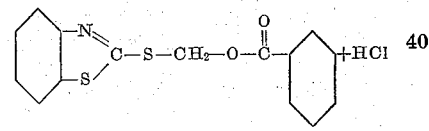

In the preparation of benzothiazyl 1-thio methylene phenyl carbamate a mixture of 19.7 grams of benzothiazyl 1-thio methylene hydrin and 17.0 grams of phenyl isocyanate was heated for a period of two hours in a boiling water bath. Some frothing occurred during the period of heating. The mass was allowed to cool and washed with petroleum ether, in which the reaction product is insoluble, then taken up in 75 cc. of hot benzene and chilled. 3.6 grams of a white solid melting at 162–165° C. were obtained. The benzene solution, upon being treated with petroleum ether, yielded the remainder of the product in an amount of 30 grams and in the form of a soft, amber colored resin. An analysis of the solid product melting at 162–165° C. gave a nitrogen content of 8.89% and an average sulphur content of 19.25% as compared with the theoretical nitrogen and sulphur contents for benzothiazyl 1-thio methylene phenyl carbamate of 8.90% and 20.30%, respectively. The reaction is believed to proceed as follows:

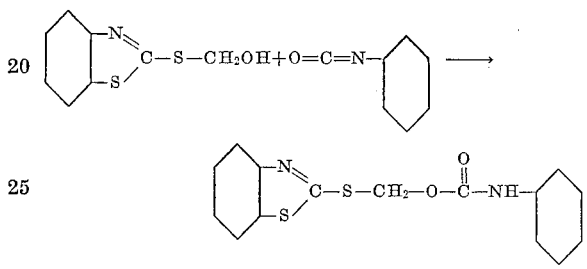

The corresponding alpha naphthyl carbamate compound is prepared by heating a mixture of 20.7 grams of benzothiazyl 1-thio methylene hydrin and 20.0 grams of alpha naphthyl isocyanate for a period of 8½ hours in a boiling water bath. The mass was cooled, the resulting solid was washed and then triturated with petroleum ether, filtered and dried. 38.5 grams of a crude product melting at 165–170° C. were obtained. Upon recrystallization from benzene this product melted at 180.5° C. It was found to contain an average nitrogen content of 7.67% and an average sulphur content of 17.80% as compared with the theoretical nitrogen and sulphur contents for benzothiazyl 1-thio methylene alpha naphthyl carbamate of 7.71% and 17.62%, respectively. The equation representing the reaction is as follows:

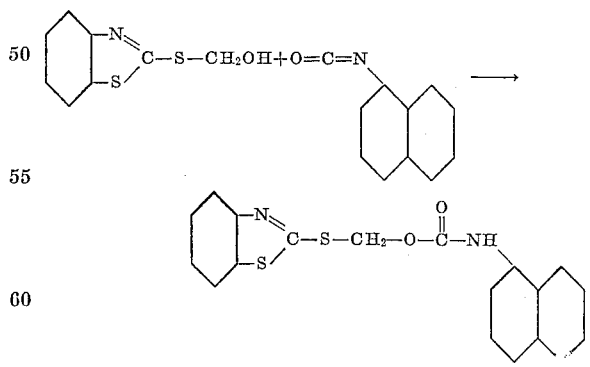

Other thiazyl 1-thio methylene hydrins which may be reacted with acyl halides and with isocyanates in the practice of the invention are the naphtha thiazyl 1-thio methylene hydrins, alpha and beta, the xylyl thiazyl 1-thio methylene hydrins, 4-nitro benzothiazyl 1-thio methylene hydrin, 5-nitro benzothiazyl 1-thio methylene hydrin, 4-chlor benzothiazyl 1-thio methylene hydrin, 4-nitro 5-chlor benzothiazyl 1-thio methylene hydrin, 3-phenyl benzothiazyl 1-thio methylene hydrin, 3-methyl benzothiazyl 1-thio methylene hydrin, 5-ethyl benzothiazyl 1-thio methylene hydrin, 3 or 5-methoxy benzothiazyl 1-thio methylene hydrin, 3 or 5-ethoxy benzothiazyl 1-thio methylene hydrin, 5-benzyl benzothiazyl 1-thio methylene hydrin, 3-methyl 5-nitro benzothiazyl 1-thio methylene hydrin, 3-phenyl thiazyl 1-thio methylene hydrin, thiazyl 1-thio methylene hydrin, 3-4-dimethyl thiazyl 1-thio methylene hydrin, and other halogen-, nitro-, and alkoxy substituted arylene thiazyl 1-thio methylene hydrins. It is to be understood that the word "arylene", except when expressly limited to being a hydrocarbon, includes such substituents as mentioned and other like non-hydrocarbon substituents such as acyl radicals.

Similarly, other aromatic isocyanates may be reacted with the thiazyl 1-thio methylene hydrins in the practice of the invention, examples being the ortho and para tolyl isocyanates, beta naphthyl isocyanates, substituted or unsubstituted by alkyl, halo, aralkyl, alkoxy, nitro and like radicals, the ortho and para nitrophenyl isocyanates, the xylyl isocyanates, the cresyl isocyanates, ortho and para hydroxy phenyl isocyanates, ortho and para phenetidyl isocyanates, ortho and para anisyl isocyanates, etc. The aromatic isocyanates of the benzene and naphthalene series constitute a preferred class.

In like manner other acyl halides may be employed in the practice of the invention. It will be understood, however, that the acyl chlorides are preferred. Illustrative are propionyl chloride, n-butyryl chloride, iso butyryl chloride, the ortho and para methyl benzoyl chlorides, the alpha and beta naphthoyl chlorides, the ortho and para hydroxy benzoyl chlorides, the ortho and para nitro benzoyl chlorides, the cresotinyl chlorides, ortho and para ethoxy benzoyl chlorides, ortho and para methoxy benzoyl chlorides, p-phenyl benzoyl chloride, p-benzyl benzoyl chloride, the acid halides of o-benzoyl benzoic acid, etc.

Other illustrative benzothiazyl 1-thio methylene acylates are benzothiazyl 1-thio methylene propionate, benzothiazyl 1-thio methylene butyrate, 3-methyl benzothiazyl 1-thio methylene p-hydroxy benzoate, 5-chlor benzothiazyl 1-thio methylene o-ethoxy benzoate, p-tolyl thiazyl 1-thio methylene naphthoate, alpha naphthyl thiazyl 1-thio methylene p-nitro benzoate, and the like. Other illustrative thiazyl 1-thio methylene aromatic carbamates are benzothiazyl 1-thio methylene p-tolyl carbamate, 5-chlor benzothiazyl 1-thio methylene cresyl carbamate, 3-phenyl benzothiazyl 1-thio methylene beta naphthyl carbamate, 6-phenetidyl thiazyl 1-thio methylene p-hydroxy phenyl carbamate, 3-5-dimethyl benzothiazyl 1-thio methylene p-phenetidyl carbamate, etc.

The compounds to which the invention relates may be employed in practically any of the standard rubber formulae. In general, however, where the rubber stock is to be vulcanized at temperatures such as 260° F., it will be desirable to employ basic nitrogen-containing accelerators in conjunction with both the thiazyl 1-thio methylene acylates and the thiazyl 1-thio methylene aromatic carbamates. At temperatures such as 285° F., however, the thiazyl 1-thio methylene aromatic carbamates may be employed without adding any basic nitrogen-containing accelerator. In most cases, however, it will be desirable to add at least a small amount of one or more of such basic accelerators.

One formula in which the compounds of the invention have been found to be excellent accelerators is the following:

| | Parts by weight |
|---|---|
| Extracted pale crepe rubber | 100 |
| Zinc oxide | 5 |
| Sulphur | 3 |
| Diphenylguanidine | 0.2 |
| Stearic acid | 1.5 |
| Accelerator | 0.5 |

Results obtained by the use of this formula are summarized in the following table:

| Cure in mins. at °F. | Ult. tens., kgs./cm.² | Max. elg. in percent | Modulus in kgs./cm.² | |
|---|---|---|---|---|
| | | | 500% | 700% |
| BENZOTHIAZYL THIO METHYLENE ACETATE | | | | |
| 20/260 | 8 | 910 | 3 | 4 |
| 40 | 76 | 915 | 9 | 24 |
| 60 | 120 | 870 | 14 | 45 |
| 80 | 126 | 825 | 16 | 58 |
| BENZOTHIAZYL THIO METHYLENE BENZOATE | | | | |
| 20/260 | 5 | 815 | 3 | 4 |
| 40 | 63 | 950 | 8 | 17 |
| 60 | 102 | 850 | 14 | 40 |
| 80 | 128 | 805 | 20 | 66 |
| BENZOTHIAZYL 1—THIO METHYLENE PHENYL CARBAMATE | | | | |
| 20/260 | 92 | 920 | 10 | 26 |
| 40 | 157 | 790 | 23 | 89 |
| 60 | 175 | 745 | 33 | 134 |
| 80 | 183 | 720 | 39 | 162 |
| BENZOTHIAZYL 1—THIO METHYLENE ALPHA NAPHTHYL CARBAMATE | | | | |
| 20/260 | 102 | 875 | 12 | 36 |
| 40 | 150 | 750 | 27 | 106 |
| 60 | 180 | 740 | 34 | 140 |
| 80 | 176 | 705 | 41 | 168 |

The novel compounds to which the invention relates thus possess valuable properties as accelerators of vulcanization, particularly as delayed action accelerators. Other basic nitrogen-containing accelerators which may be employed in conjunction therewith are diortho tolyl guanidine, 2-4-diamino diphenylamine, p-p'-diamino diphenyl methane, diphenylguanidine neutral phthalate, butyl ammonium oleate, urea succinate and other urea salts, cyclohexyl amine and the like.

It is intended that the patent shall cover, by suitable expression in the appended claims, all features of patentable novelty residing in the invention.

What I claim is:

1. The process of treating rubber which comprises vulcanizing in the presence of a basic nitrogen-containing accelerator and benzothiazyl 1-thio methylene acetate.

2. Benzothiazyl 1-thio methylene acetate.

ALBERT M. CLIFFORD.